H. GULBRANSON.
PISTON PACKING.
APPLICATION FILED SEPT. 20, 1911.

1,032,204.

Patented July 9, 1912.
2 SHEETS—SHEET 1.

Witnesses
M. F. Garrett
U. B. Hillyard.

Inventor
Hans Gulbranson
By Victor J. Evans
Attorney

H. GULBRANSON.
PISTON PACKING.
APPLICATION FILED SEPT. 20, 1911.

1,032,204.

Patented July 9, 1912.
2 SHEETS—SHEET 2.

Witnesses
M. H. Hammett
V. B. Hillyard

Inventor
Hans Gulbranson
By Victor J. Evans
Attorney

UNITED STATES PATENT OFFICE.

HANS GULBRANSON, OF MASON CITY, IOWA.

PISTON-PACKING.

1,032,204. Specification of Letters Patent. Patented July 9, 1912.

Application filed September 20, 1911. Serial No. 650,352.

*To all whom it may concern:*

Be it known that I, HANS GULBRANSON, a machinist, citizen of the United State, residing at Mason City, in the county of Cerro Gordo and State of Iowa, have invented new and useful Improvements in Piston-Packing, of which the following is a specification.

The present invention provides a packing designed chiefly for pistons to insure a close fit between the walls of a cylinder and the piston arranged to operate therein, the invention dealing more particularly with metallic packing utilizing rings as the packing element.

Heretofore it has been quite common to provide a piston with one or more annular grooves in each of which is fitted a piston ring.

The present invention provides a plurality of piston rings arranged side by side in such a manner as to break joint, the joint of one packing ring being closed by the adjacent packing ring. Where single packing rings are employed it is necessary to provide a piston with two or more annular grooves in each of which is fitted a packing ring. In accordance with the present invention the piston may have a single groove or annular seat in which a plurality of piston rings are fitted, thereby insuring a close joint and the provision of a piston of minimum length.

The invention consists of the novel features, details of construction and combination of parts, which hereinafter will be more particularly set forth, illustrated in the accompanying drawings, and pointed out in the appended claims.

Figure 1:
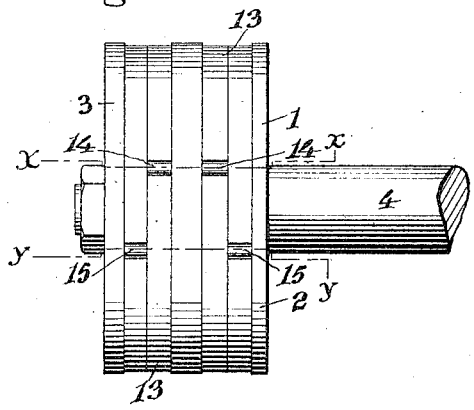
Figure 2:
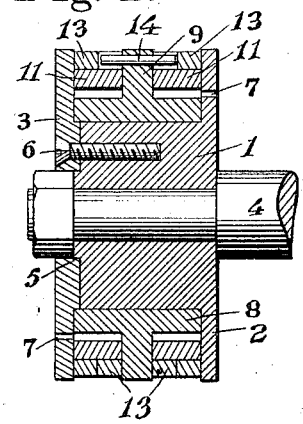
Figure 3:
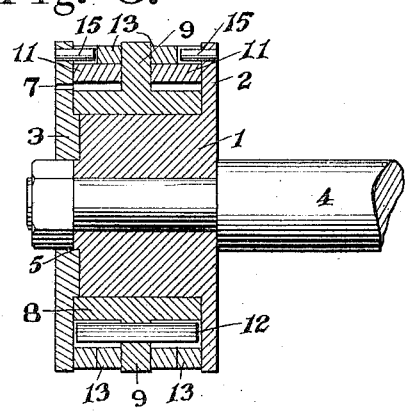
Figure 4:
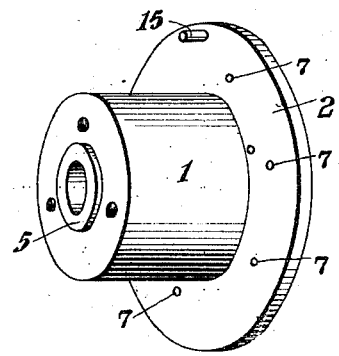
Figure 5:
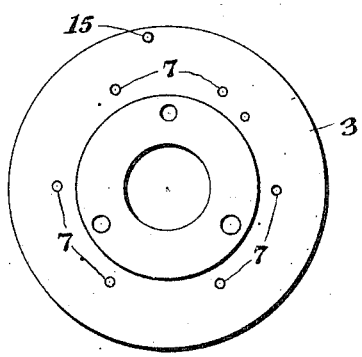
Figure 6:
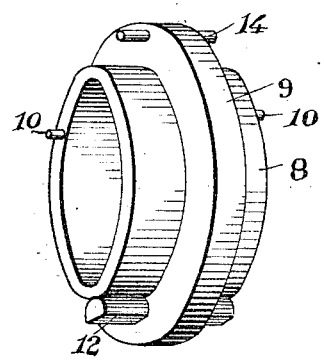
Figure 7:
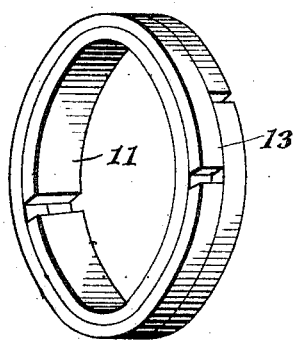
Figure 8:
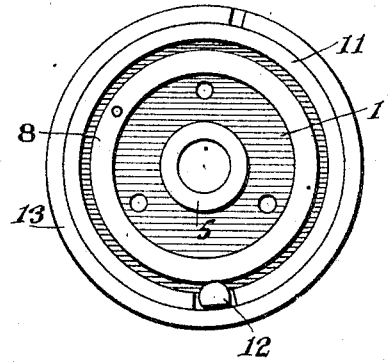

Referring to the drawings, forming a part of the specification, Figure 1 is a side view of a piston provided with packing embodying the invention. Fig. 2 is a section on the line $x$—$x$ of Fig. 1. Fig. 3 is a section on the line $y$—$y$ of Fig. 1. Fig. 4 is a detail perspective view of the piston body. Fig. 5 is a detail view of the cap plate. Fig. 6 is a detail perspective view of the packing carrier. Fig. 7 is a detail perspective view of one of the expansion rings and the packing rings mounted thereon. Fig. 8 is an end view of the piston with the cap plate removed.

Corresponding and like parts are referred to in the following description, and indicated in all the views of the drawings, by the same reference characters.

The piston comprises a piston body 1, which is of circular form and provided at one end with an outer flange 2 forming a head. A cap plate 3 is secured to the opposite end of the piston body and constitutes the other head between which and the part 2 the packing and the packing carrier are confined. The piston body has a central opening in which the piston rod 4 is secured. A boss 5 is formed at one end of the piston body and enters an opening formed centrally of the cap plate 3 and serves to center the latter. Any means may be employed for securing the cap plate 3 to the piston body and as shown machine screws or bolts 6 are employed. Small openings 7 are formed in the flanges 2 and cap plate 3 a short distance from the outer edges thereof to admit of steam, compressed air or the like passing therethrough to enter the space in the rear of the expansion rings to force the latter outward, thereby supplementing the spring action of said expansion rings and the packing rings, thereby insuring a close joint being maintained between the packing and the walls of the cylinder.

The packing carrier consists of a cylindrical support 8 having a centrally disposed dividing flange 9. The cylindrical support 8 fits snugly upon the piston body 1 and is prevented from turning thereon by means of dowels 10, which project from opposite ends of the cylinder and enter openings formed in the flange 2 and cap plate 3. The diameter of the dividing flange 9 coincides with the diameter of the flange 2 and cap plate 3. An expansion ring 11 is fitted upon each end of the packing carrier and is of a diameter to leave an intervening space which comes opposite the openings 7 into which the steam, compressed air, or other medium enters to exert an outward pressure upon the expansion rings to supplement their spring action to insure the formation of a close joint between the packing rings and the walls of the cylinder. The expansion rings are prevented from turning upon the cylindrical support 8 by means of a pin 12, which is passed through an opening formed in the dividing flange 9 and projects from opposite sides thereof so as to enter the spaces formed between the split ends of the expansion rings. Packing rings 13 are slipped upon the expansion rings and lie side by side and are arranged to break joint. Two packing rings 13 are fitted upon each expansion ring 11, the packing rings being prevented from turning by means of dowels 14 and 15 projecting from the dividing flange 9 and the parts 2 and 3. The dowel 14 is supported in an opening formed in the dividing flange 9 and projects from the latter a distance to enter the spaces formed between the split ends of the inner packing rings. The dowels 15 project from respectively the outer flange 2 and the cap plate 3 and enter the spaces formed between the split ends of the outer packing rings.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:

1. In combination a piston body having heads at opposite ends, a packing carrier mounted upon the piston body and confined between the heads thereof and comprising a cylinder and a centrally disposed outwardly extending dividing flange, dowels between the ends of the cylinder and the heads of the piston, dowels projecting laterally from the said dividing flange, other dowels extending inwardly from the heads of the piston, a pin supported in the said dividing flange and projecting laterally therefrom adjacent the cylinder, expansion rings mounted upon end portions of the cylinder at the sides of the dividing flange and having the end portions of the before mentioned pin coming between their split ends, and a pair of split expansion packing rings mounted upon each of the said expansion rings and arranged to break joint, the dowels of the dividing flange entering the spaces between the split ends of the inner packing rings and the dowels of the piston heads entering the spaces between the split ends of the outer packing rings.

2. In combination a piston comprising a piston body having an outer flange at one end and a centrally disposed boss at its opposite end, a cap plate secured to the end of the piston body provided with the boss, said cap plate and flange constituting heads, a packing carrier mounted upon the piston body and confined between the heads thereof and comprising a cylinder and a centrally disposed outwardly extending dividing flange, dowels between the ends of the cylinder and the heads of the piston, dowels projecting laterally from the said dividing flange, other dowels extending inwardly from the heads of the piston, a pin supported in the said dividing flange and projecting laterally therefrom adjacent the cylinder, expansion rings mounted upon end portions of the cylinder at the sides of the dividing flange and having the end portions of the before mentioned pin coming between their split ends, and a pair of split expansion packing rings mounted upon each of the said expansion rings and arranged to break joint, the dowels of the dividing flange entering the spaces between the split ends of the inner packing rings and the dowels of the piston heads entering the spaces between the split ends of the outer packing rings.

In testimony whereof I affix my signature in presence of two witnesses.

HANS GULBRANSON.

Witnesses:
LLOYD B. TAIT,
C. H. SMITH.